A. J. McMillen,
Fruit Can.
No. 97,669.  Patented Dec. 7, 1869.
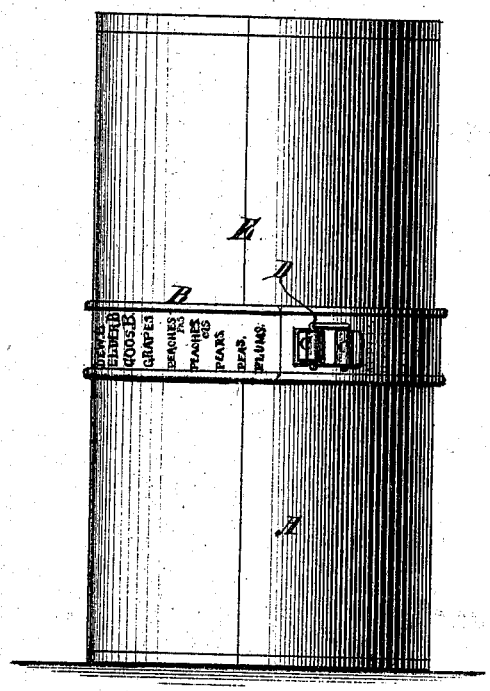

United States Patent Office.

A. J. McMILLEN, OF RAVENSWOOD, WEST VIRGINIA.

Letters Patent No. 97,669, dated December 7, 1869.

IMPROVEMENT IN FRUIT-CANS.

The Schedule referred to in these Letters Patent and making part of the same.

*To all whom it may concern:*

Be it known that I, A. J. McMILLEN, of Ravenswood, in the county of Jackson, and State of West Virginia, have invented a new and useful Improvement in Fruit-Cans; and I do hereby declare that the following is a full, clear, and exact description thereof, which will enable others skilled in the art to make and use the same, reference being had to the accompanying drawing, forming part of this specification.

This invention relates to improvements in cans, of tin, or other thin sheet-metal, for putting up fruit.

It consists in the application of a strong strengthening-band or hoop at the centre, between the ends, to prevent the cans from collapsing, and adapted, also, as a register to designate the name of any fruit which may be put into the can.

The drawing represents an elevation of my improved can.

A is the can, made of tin, in the usual way, and B, the strengthening-hoop, preferably made of tin, and wired or doubled over at the edges, for strengthening it, and provided with hoops C on each end, for connecting said ends by a staple, D, having a tendency to draw the hoop tightly around the can, when placed thereon, at the centre.

I do not, however, desire to limit myself to any particular fastening-devices, as any device that will draw the hoop snugly around the can will accomplish my object, which is to hold these hoops so snugly around the cans as to prevent collapsing, which they are very liable to, when made of large size, and of thin tin, in consequence of the vacuum formed within, when the fruit cools, and the steam and gases condense.

These strong, rigid hoops prevent collapsing, by reason of resisting the tendency of the cans to flatten, which they must do, to some extent, before they can collapse.

I also propose to stamp the names of all such fruits as are put up in cans, on these hoops, preferably in alphabetical order, and apply the hoops so that the name of the fruit in the can will coincide with the line E of the seam of the can, when it is placed thereon, or any other distinguishing mark, to designate the kind of fruit contained in the can.

Having thus described my invention,

I claim as new, and desire to secure by Letters Patent—

As a new article of manufacture, fruit-cans, provided with the strengthening-hoops B, arranged for clamping tightly around the can, and provided with the lists of names of the fruits, for adjustment, relatively to the seam, or other distinguishing mark, all substantially as specified.

A. J. McMILLEN.

Witnesses:
C. M. WEST,
C. A. STAATS.